United States Patent
Chen

(10) Patent No.: US 7,445,296 B1
(45) Date of Patent: Nov. 4, 2008

(54) BICYCLE HUB HAVING ENHANCED STRENGTH

(75) Inventor: Ching-Shu Chen, Changhua (TW)

(73) Assignee: Chosen Co., Ltd., Changhua Hsien (TW)

( * ) Notice: Subject to any disclaimer, the term of this patent is extended or adjusted under 35 U.S.C. 154(b) by 113 days.

(21) Appl. No.: 11/491,733

(22) Filed: Jul. 24, 2006

(51) Int. Cl.
B60B 27/02 (2006.01)

(52) U.S. Cl. .................. 301/110.5; 192/64; 192/110 B; 384/545; 384/275

(58) Field of Classification Search .............. 301/110.5; 192/64, 110 B, 113.32; 384/275, 296, 545
See application file for complete search history.

(56) References Cited

U.S. PATENT DOCUMENTS

| | | | | |
|---|---|---|---|---|
| 2,675,283 A | * | 4/1954 | Thomson | 384/299 |
| 4,717,268 A | * | 1/1988 | Orkin | 384/280 |
| 4,913,562 A | * | 4/1990 | Rosen | 384/276 |
| 5,137,374 A | * | 8/1992 | Orkin | 384/298 |
| 5,219,232 A | * | 6/1993 | Adams et al. | 384/275 |
| 5,398,294 A | * | 3/1995 | Narkon | 384/280 |
| 5,820,270 A | * | 10/1998 | Richardson | 384/275 |
| 6,260,681 B1 | * | 7/2001 | Chen | 192/64 |
| 6,827,497 B2 | * | 12/2004 | Chen | 384/545 |
| 6,907,972 B2 | * | 6/2005 | Chen | 192/64 |
| 2007/0199788 A1 | * | 8/2007 | Chen | 192/64 |

* cited by examiner

*Primary Examiner*—Russell D. Stormer
*Assistant Examiner*—Kip T Kotter
(74) *Attorney, Agent, or Firm*—Alan Kamrath; Kamrath & Associates PA

(57) ABSTRACT

A hub for a bicycle includes a shaft, a hub body rotatably mounted on the shaft, a drive seat rotatably mounted on the shaft and engaged with the hub body, and a self-lubricating bearing mounted between the drive seat and the shaft. Thus, the self-lubricating bearing has an inner wall contacting with an outer wall of the shaft completely and an outer wall contacting with an inner wall of the drive seat completely, so that the external force applied on the self-lubricating bearing is distributed evenly and smoothly to prevent the self-lubricating bearing from being distorted or deformed due to a stress concentration, thereby enhancing the lifetime of the self-lubricating bearing.

17 Claims, 7 Drawing Sheets

BICYCLE HUB HAVING ENHANCED STRENGTH

BACKGROUND OF THE INVENTION

1. Field of the Invention

The present invention relates to a hub and, more particularly, to a hub for a bicycle.

2. Description of the Related Art

A conventional ratchet hub for a bicycle in accordance with the prior art shown in FIGS. 6 and 7 comprises a shaft 10, a hub body 11 rotatably mounted on the shaft 10 and having an inside formed with a fixing recess 110, a locking ring 111 secured in the fixing recess 110 of the hub body 11 to drive and rotate the hub body 11 and having an inside formed with a plurality of oneway ratchet teeth 112, a drive seat 12 rotatably mounted on the shaft 10 and having an end face 120 extended into the locking ring 111 and formed with a plurality of receiving slots 122, a plurality of pawl members (not shown) each pivotally mounted in the respective receiving slot 122 of the drive seat 12 and each meshing with the oneway ratchet teeth 112 of the locking ring 111, and a plurality of ball bearings 14 mounted between the drive seat 12 and the shaft 10.

In assembly, the hub body 11 is connected to a wheel (not shown) of the bicycle, the shaft 10 is connected to a frame (not shown) of the bicycle, the drive seat 12 is connected to a freewheel 13 of the bicycle, and the freewheel 13 of the bicycle is driven by a chain (not shown) which is driven by a chainwheel (not shown) which is driven by a pedal (not shown) that is pedalled by a rider.

In operation, when the freewheel 13 is rotated normally, the drive seat 12 is rotated with the freewheel 13 to move the pawl members. At this time, the pawl members are locked in the oneway ratchet teeth 112 of the locking ring 111, so that the locking ring 111 is rotated by the drive seat 12 to rotate the hub body 11 which rotates the wheel. On the contrary, when the freewheel 13 stops rotating or when the rotation speed of the wheel is greater than that of the freewheel 13 (when the bicycle is moved on the downward slope), the rotation speed of the locking ring 111 is greater than that of the drive seat 12, so that the oneway ratchet teeth 112 of the locking ring 111 press each of the pawl members. Thus, the drive seat 12 performs an idle rotation, so that the locking ring 111 and the hub body 11 are not rotated by the drive seat 12 and will not interfere with rotation of the drive seat 12. When the rotation speed of the drive seat 12 (or the freewheel 13) is greater than that of the hub body 11 (or the wheel), the locking ring 111 and the hub body 11 are rotated by the drive seat 12 again.

However, when an external force is applied on the hub due to a violent hit or jump, the external force applied on the hub is entirely supported by the ball bearings 14 as shown in FIG. 7, so that the ball bearings 14 are easily distorted or deformed due to a stress concentration, thereby decreasing the lifetime of the ball bearings 14. In addition, when the ball bearings 14 are worn out or even broken, the shaft 10 is easily damaged by the broken pieces of the ball bearings 14, thereby decreasing the lifetime of the shaft 10. Further, each of the ball bearings 14 has a larger size, so that the thickness of the hub cannot be changed freely according to the practical requirement, thereby decreasing the versatility of the hub.

BRIEF SUMMARY OF THE INVENTION

In accordance with the present invention, there is provided a hub, comprising a shaft, a hub body rotatably mounted on the shaft, a drive seat rotatably mounted on the shaft and having a first end face engaged with the hub body, and a self-lubricating bearing mounted between the drive seat and the shaft.

The primary objective of the present invention is to provide a bicycle hub having a greater strength.

Another objective of the present invention is to provide a hub, wherein the self-lubricating bearing has an inner wall contacting with an outer wall of the shaft or the bushing completely and an outer wall contacting with an inner wall of the drive seat completely, so that the external force applied on the self-lubricating bearing is distributed evenly and smoothly to prevent the self-lubricating bearing from being distorted or deformed due to a stress concentration, thereby enhancing the lifetime of the self-lubricating bearing.

A further objective of the present invention is to provide a hub, wherein the external force applied on the self-lubricating bearing is distributed evenly and smoothly, so that the hub has a greater strength and can withstand a greater stress.

A further objective of the present invention is to provide a hub, wherein the self-lubricating bearing has a thickness which is changed arbitrarily, so that the thickness of the hub can be changed freely according to the practical requirement, thereby enhancing the versatility of the hub.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
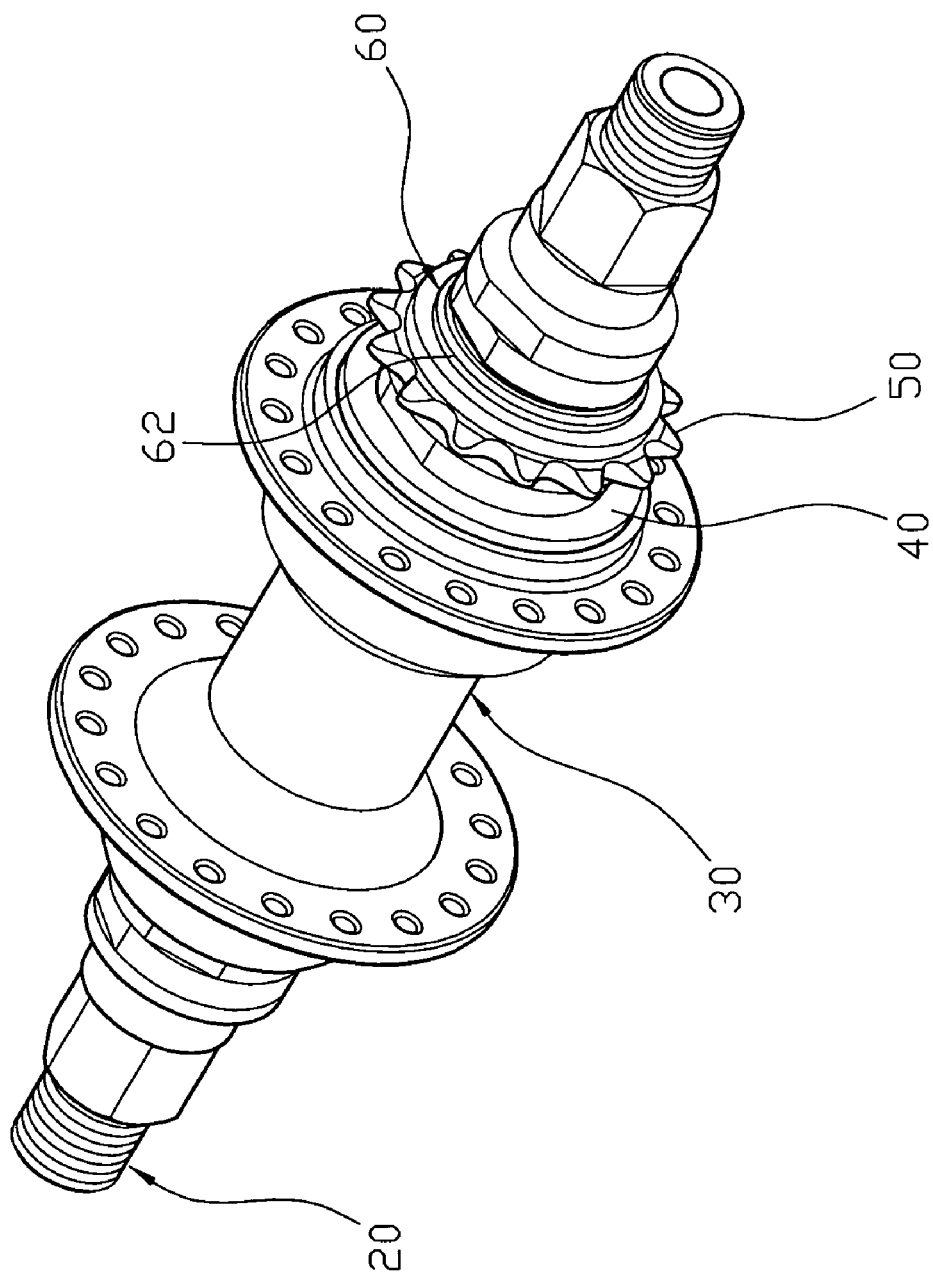
FIG. 1 is a perspective view of a hub in accordance with the preferred embodiment of the present invention.
Figure 2:
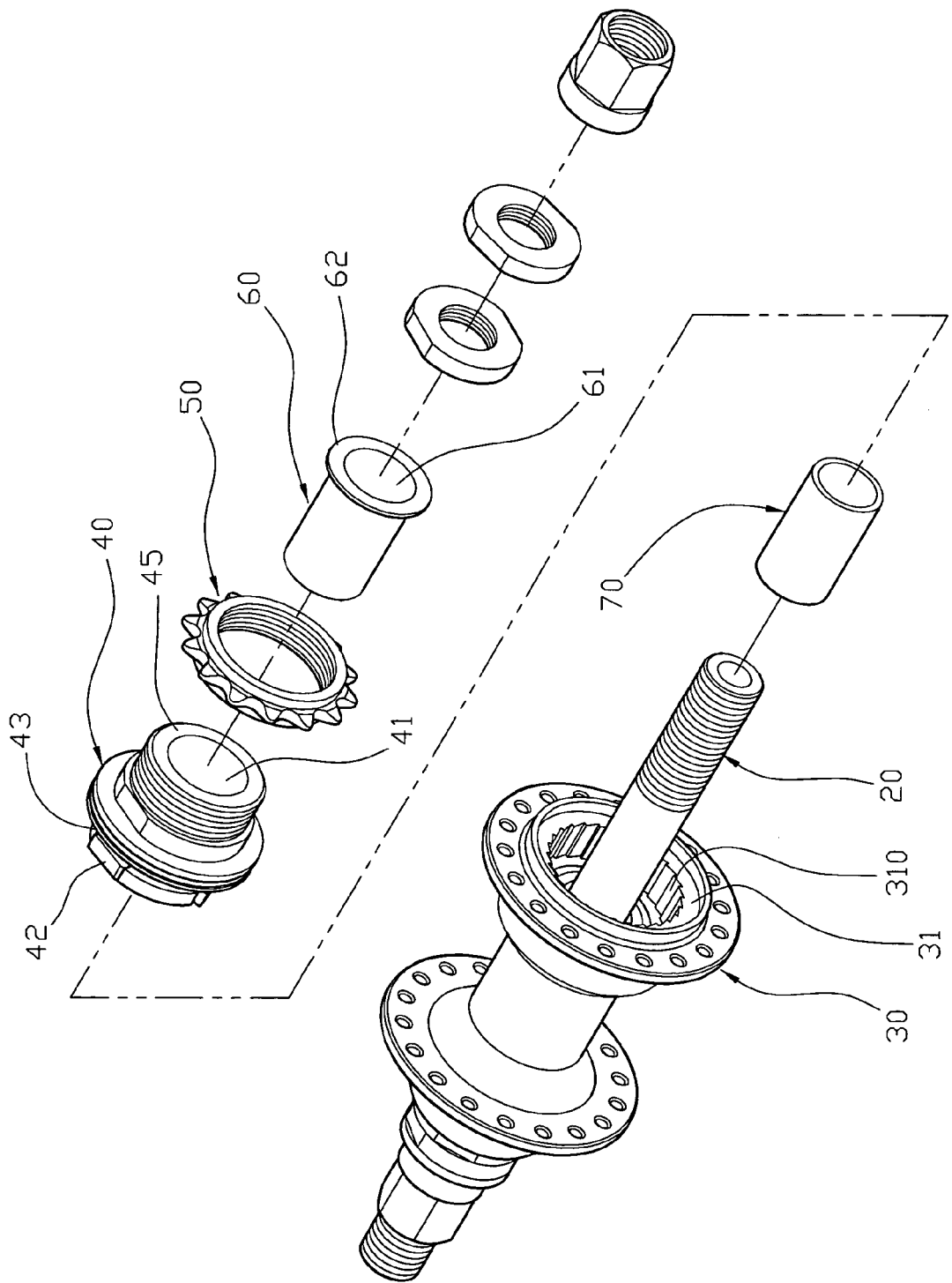
FIG. 2 is an exploded perspective view of the hub as shown in FIG. 1.
Figure 3:
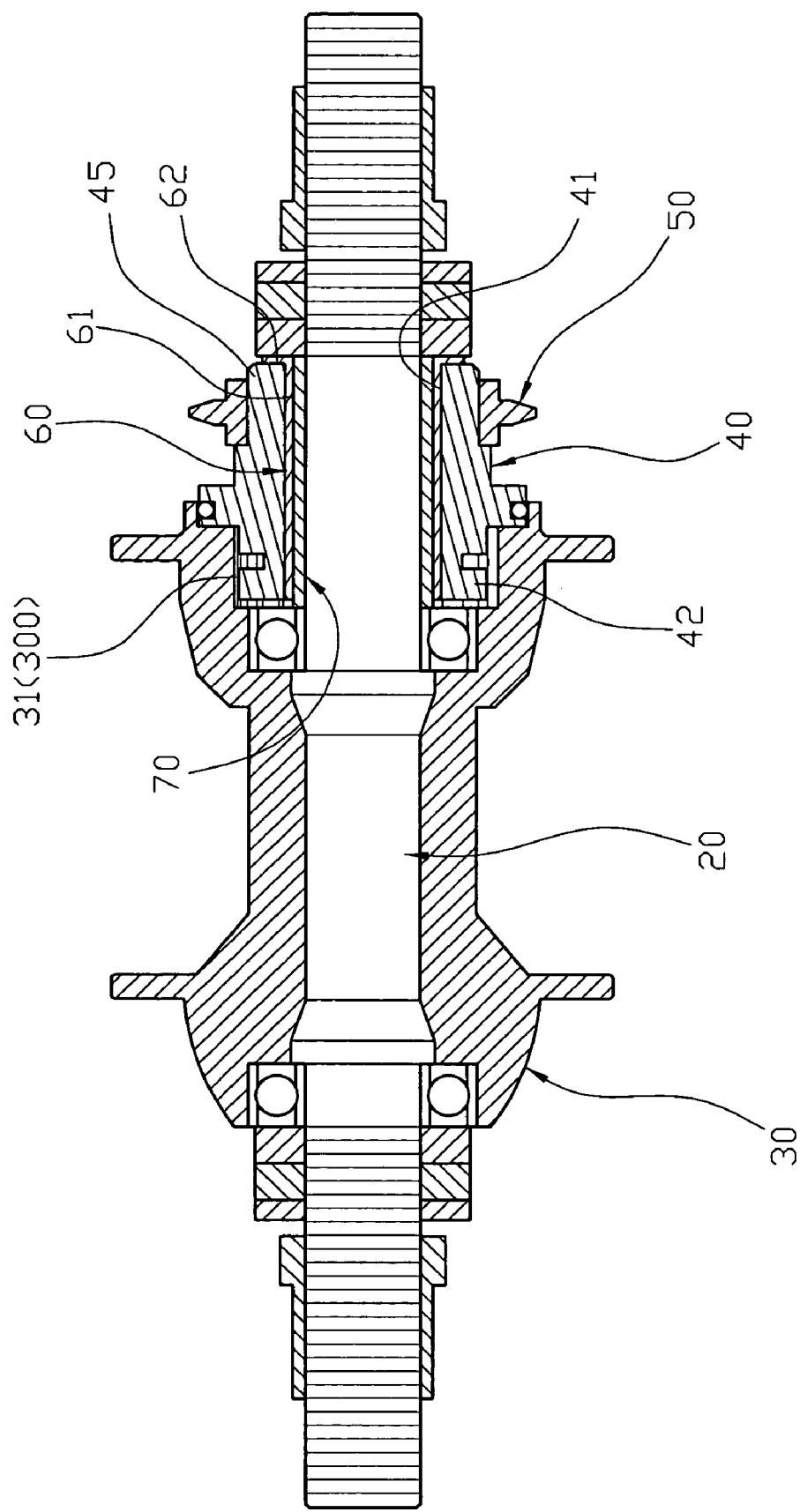
FIG. 3 is a plan cross-sectional view of the hub as shown in FIG. 1.

Referring to the drawings and initially to FIGS. 1-3, a hub for a bicycle in accordance with the preferred embodiment of the present invention comprises a shaft 20, a hub body 30 rotatably mounted on the shaft 20 and having an inside formed with a fixing recess 300, a locking ring 31 secured in the fixing recess 300 of the hub body 30 to drive and rotate the hub body 30 and having an inside formed with a plurality of oneway ratchet teeth 310, a drive seat 40 rotatably mounted on the shaft 20 and having a first end face 42 extended into the locking ring 31 and formed with a plurality of receiving slots 43, a plurality of pawl members (not shown) each pivotally mounted in the respective receiving slot 43 of the drive seat 40 and each meshing with the oneway ratchet teeth 310 of the locking ring 31, and a self-lubricating bearing 60 mounted between the drive seat 40 and the shaft 20.

In the preferred embodiment of the present invention, the hub further comprises a bushing 70 mounted between the self-lubricating bearing 60 and the shaft 20 to prevent the self-lubricating bearing 60 from directly contacting with the shaft 20 made of metal.

The drive seat 40 has an inside formed with a mounting hole 41. The self-lubricating bearing 60 is inserted into the mounting hole 41 of the drive seat 40. The self-lubricating bearing 60 has a substantially cylindrical shape and has a diameter corresponding to that of the mounting hole 41 of the drive seat 40. The self-lubricating bearing 60 has a length corresponding to that of the drive seat 40 and has an end portion formed with a radially and outwardly extending limit flange 62 rested on a second end face 45 of the drive seat 40. The self-lubricating bearing 60 has an inside formed with a mounting bore 61 to allow passage of the shaft 20 and the bushing 70. Thus, the self-lubricating bearing 60 is rotatably mounted between the drive seat 40 and the shaft 20 to reduce the rotation wear and resistance between the drive seat 40 and the shaft 20 to the minimum.

In assembly, the hub body 30 is connected to a wheel (not shown) of the bicycle, the shaft 20 is connected to a frame (not shown) of the bicycle, the drive seat 40 is connected to a freewheel 50 of the bicycle, and the freewheel 50 of the bicycle is driven by a chain (not shown) which is driven by a chainwheel (not shown) which is driven by a pedal (not shown) that is pedalled by a rider.

In operation, when the freewheel 50 is rotated normally, the drive seat 40 is rotated with the freewheel 50 to move the pawl members. At this time, the pawl members are locked in the oneway ratchet teeth 112 of the locking ring 31, so that the locking ring 31 is rotated by the drive seat 40 to rotate the hub body 30 which rotates the wheel. On the contrary, when the freewheel 50 stops rotating or when the rotation speed of the wheel is greater than that of the freewheel 50 (when the bicycle is moved on the downward slope), the rotation speed of the locking ring 31 is greater than that of the drive seat 40, so that the oneway ratchet teeth 112 of the locking ring 31 press each of the pawl members. Thus, the drive seat 40 performs an idle rotation, so that the locking ring 31 and the hub body 30 are not rotated by the drive seat 40 and will not interfere with rotation of the drive seat 40. When the rotation speed of the drive seat 40 (or the freewheel 50) is greater than that of the hub body 30 (or the wheel), the locking ring 31 and the hub body 30 are rotated by the drive seat 40 again.

Accordingly, the self-lubricating bearing 60 has an inner wall contacting with an outer wall of the shaft 20 or the bushing 70 completely and an outer wall contacting with an inner wall of the drive seat 40 completely, so that the external force applied on the self-lubricating bearing 60 is distributed evenly and smoothly to prevent the self-lubricating bearing 60 from being distorted or deformed due to a stress concentration, thereby enhancing the lifetime of the self-lubricating bearing 60. In addition, the external force applied on the self-lubricating bearing 60 is distributed evenly and smoothly, so that the hub has a greater strength and can withstand a greater stress. Further, the self-lubricating bearing 60 has a thickness which is changed arbitrarily, so that the thickness of the hub can be changed freely according to the practical requirement, thereby enhancing the versatility of the hub.

Figure 4:
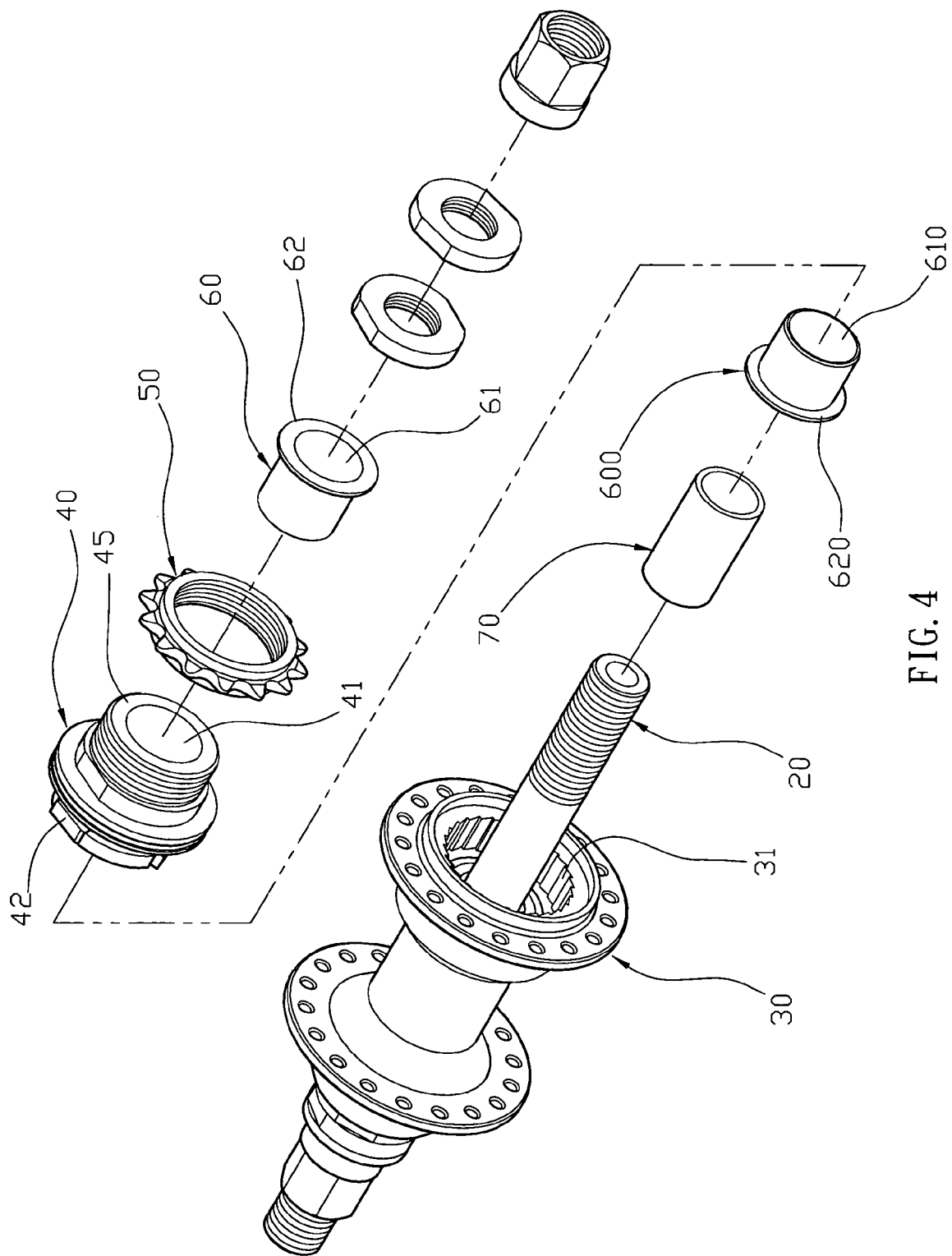
FIG. 4 is an exploded perspective view of a hub in accordance with another preferred embodiment of the present invention.
Figure 5:
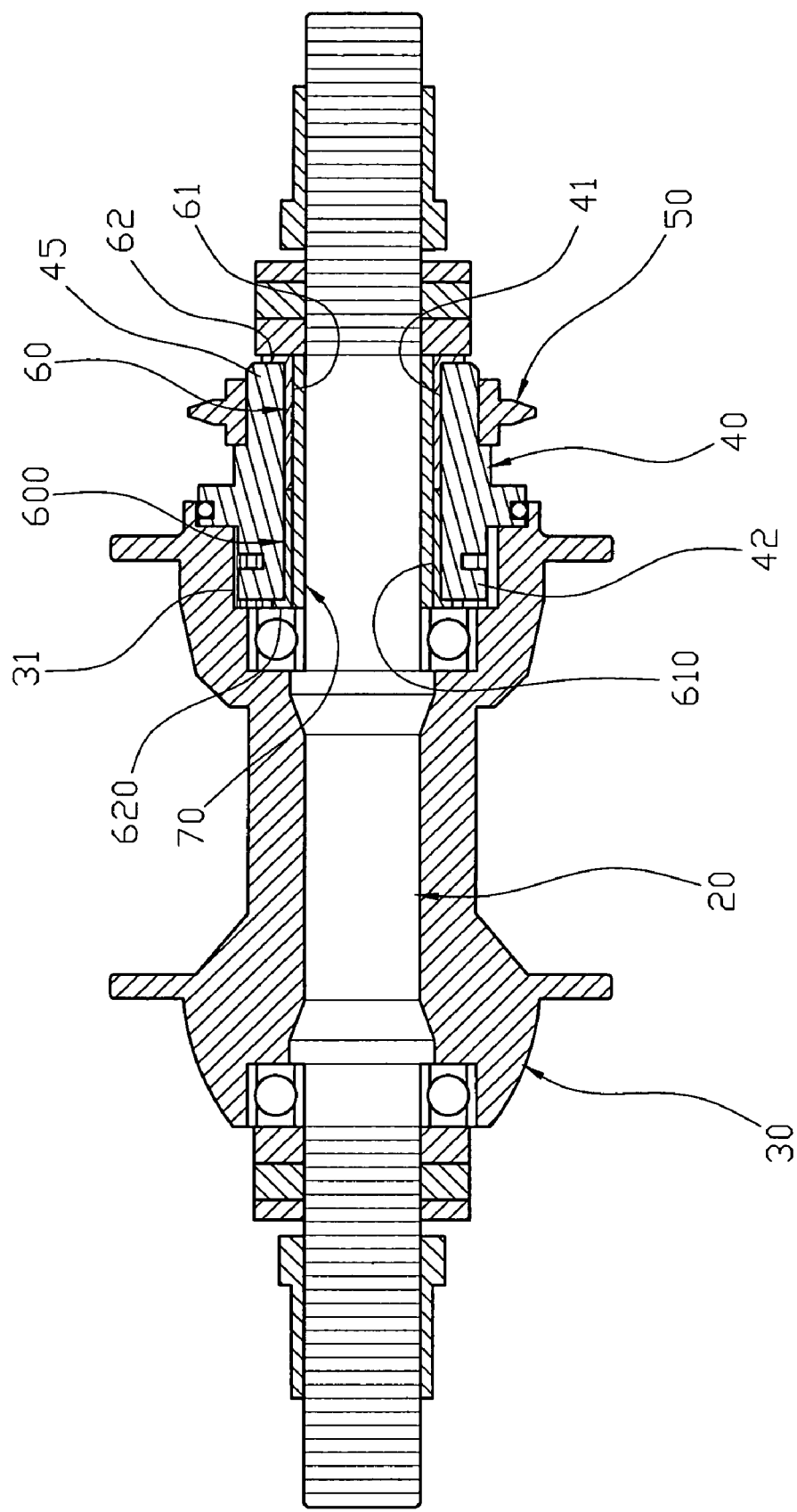
FIG. 5 is a plan cross-sectional assembly view of the hub as shown in FIG. 4.
Figure 6:
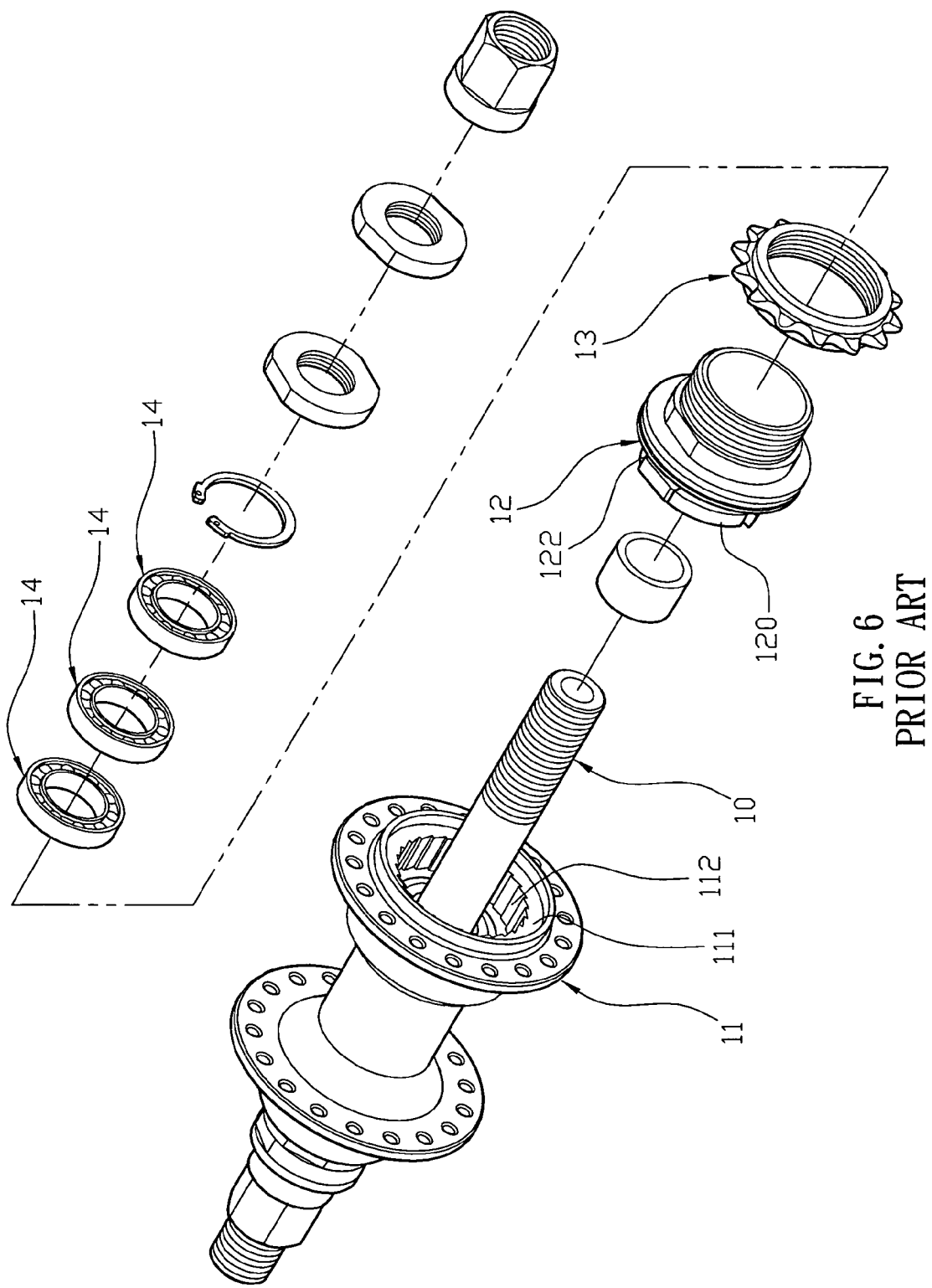
FIG. 6 is an exploded perspective view of a conventional hub in accordance with the prior art.
Figure 7:
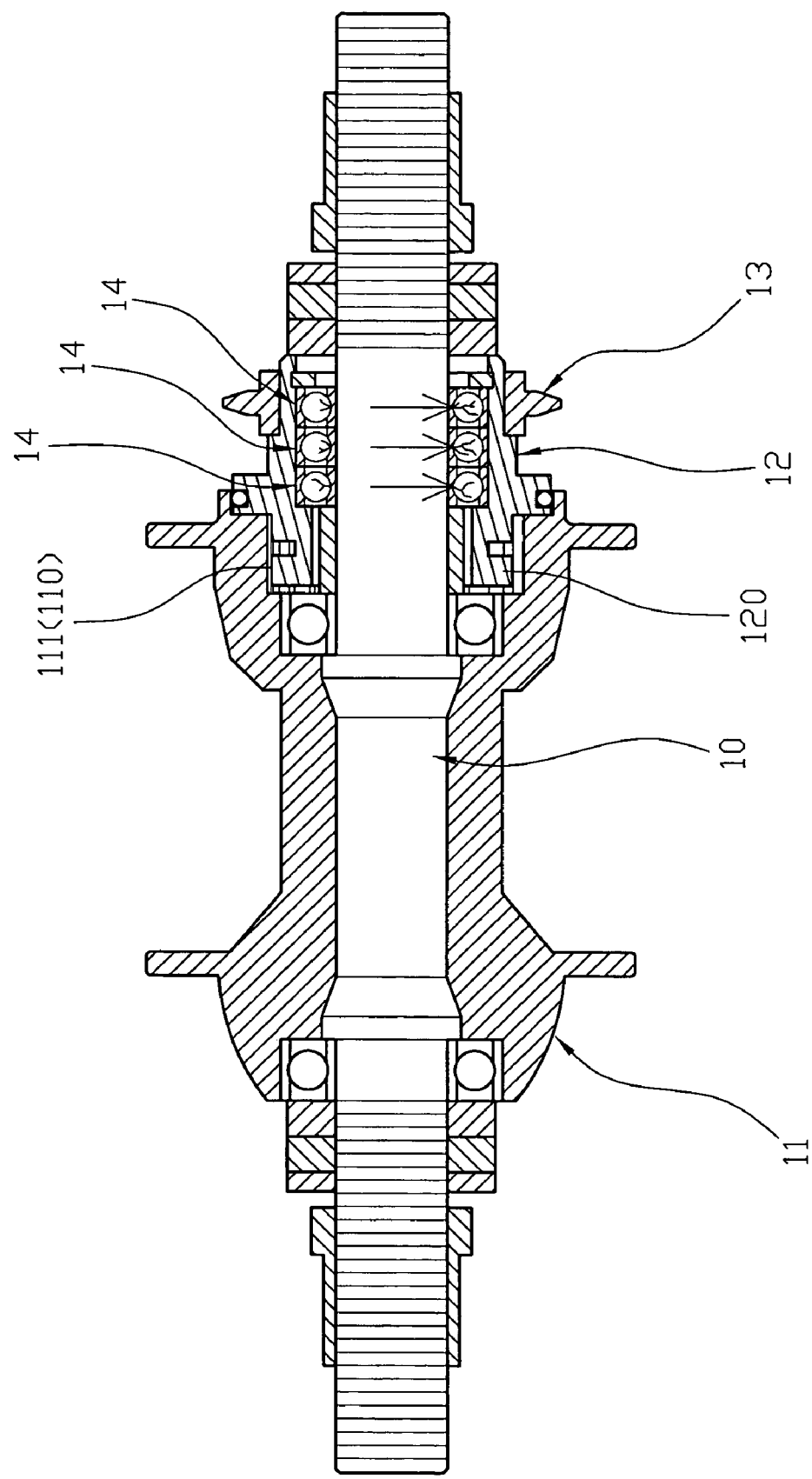
FIG. 7 is a plan cross-sectional assembly view of the conventional hub as shown in FIG. 6.

Referring to FIGS. 4 and 5, the hub further comprises a secondary self-lubricating bearing 600 mounted between the drive seat 40 and the shaft 20 and juxtaposed to the self-lubricating bearing 60, and the bushing 70 is mounted between the secondary self-lubricating bearing 600 and the shaft 20 to prevent the secondary self-lubricating bearing 600 from directly contacting with the shaft 20 made of metal.

The secondary self-lubricating bearing 600 is inserted into the mounting hole 41 of the drive seat 40. The secondary self-lubricating bearing 600 has a substantially cylindrical shape and has a diameter corresponding to that of the mounting hole 41 of the drive seat 40. The self-lubricating bearing 60 and the secondary self-lubricating bearing 600 have a total length corresponding to that of the drive seat 40. The secondary self-lubricating bearing 600 has an end portion formed with a radially and outwardly extending limit flange 620 rested on the first end face 42 of the drive seat 40. The secondary self-lubricating bearing 600 has an inside formed with a mounting bore 610 to allow passage of the shaft 20 and the bushing 70. Thus, the secondary self-lubricating bearing 600 is rotatably mounted between the drive seat 40 and the shaft 20 to reduce the rotation wear and resistance between the drive seat 40 and the shaft 20 to the minimum.

Thus, the secondary self-lubricating bearing 600 has an inner wall contacting with an outer wall of the shaft 20 or the bushing 70 completely and an outer wall contacting with an inner wall of the drive seat 40 completely, so that the external force applied on the secondary self-lubricating bearing 600 is distributed evenly and smoothly to prevent the secondary self-lubricating bearing 600 from being distorted or deformed due to a stress concentration, thereby enhancing the lifetime of the secondary self-lubricating bearing 600.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A hub, comprising:
   a shaft;
   a hub body rotatably mounted on the shaft;
   a drive seat rotatably mounted on the shaft and having a first end face engaged with the hub body;
   a self-lubricating bearing mounted between the drive seat and the shaft;
   wherein the self-lubricating bearing has an end portion formed with a radially and outwardly extending limit flange rested on a second end face of the drive seat;
   the limit flange of the self-lubricating bearing protrudes outwardly from the second end face of the drive seat and abuts a periphery of the second end face of the drive seat.

2. The hub in accordance with claim 1, wherein the drive seat has an inside formed with a mounting hole, the self-lubricating bearing is inserted into the mounting hole of the drive seat, and the limit flange of the self-lubricating bearing protrudes outwardly from the mounting hole of the drive seat.

3. The hub in accordance with claim 2, wherein the self-lubricating bearing has a substantially stepped cylindrical shape.

4. The hub in accordance with claim 3, wherein the self-lubricating bearing has a diameter corresponding to that of the mounting hole of the drive seat.

5. The hub in accordance with claim 1, wherein the self-lubricating bearing has a length corresponding to that of the drive seat.

6. The hub in accordance with claim 1, wherein the self-lubricating bearing has an inside formed with a mounting bore to allow passage of the shaft.

7. The hub in accordance with claim 1, wherein the self-lubricating bearing is rotatably mounted between the drive seat and the shaft.

8. The hub in accordance with claim 1, further comprising a bushing mounted between the self-lubricating bearing and the shaft, wherein the self-lubricating bearing has a length equal to that of the bushing.

9. The hub in accordance with claim 8, wherein the self-lubricating bearing has an inside formed with a mounting bore to allow passage of the bushing.

10. The hub in accordance with claim 8, wherein the self-lubricating bearing has an inner wall contacting with an outer wall of the bushing completely and an outer wall contacting with an inner wall of the drive seat completely.

11. The hub in accordance with claim 1, further comprising a secondary self-lubricating bearing mounted between the drive seat and the shaft and juxtaposed to the self-lubricating bearing.

12. The hub in accordance with claim 11, wherein the drive seat has an inside formed with a mounting hole, and the secondary self-lubricating bearing is inserted into the mounting hole of the drive seat.

13. The hub in accordance with claim 12, wherein the secondary self-lubricating bearing has a substantially stepped cylindrical shape and has a diameter corresponding to that of the mounting hole of the drive seat.

14. The hub in accordance with claim 13, wherein the self-lubricating bearing and the secondary self-lubricating bearing have a total length corresponding to that of the drive seat.

15. The hub in accordance with claim 13, wherein the secondary self-lubricating bearing has an end portion formed with a radially and outwardly extending limit flange rested on the first end face of the drive seat, and the limit flange of the secondary self-lubricating bearing protrudes outwardly from the first end face of the drive seat and abuts a periphery of the first end face of the drive seat, so that the drive seat is clamped between the limit flange of the self-lubricating bearing and the limit flange of the secondary self-lubricating bearing.

16. The hub in accordance with claim 11, wherein the secondary self-lubricating bearing has an inside formed with a mounting bore to allow passage of the shaft.

17. The hub in accordance with claim 11, further comprising a bushing mounted between the self-lubricating bearing, the secondary self-lubricating bearing and the shaft, wherein the self-lubricating bearing and the secondary self-lubricating bearing have a total length equal to that of the bushing.

* * * * *